(12) United States Patent
Gresko et al.

(10) Patent No.: US 7,086,078 B1
(45) Date of Patent: Aug. 1, 2006

(54) CATV DIRECTIONAL COMPONENT WITH SIGNAL REVERSING CAPABILITY AND METHOD

(75) Inventors: Richard Gresko, Huntingdon Valley, PA (US); Raymond W. Alker, Philadelphia, PA (US)

(73) Assignee: General Instrument Corporation, Horsham, PA (US)

( * ) Notice: Subject to any disclaimer, the term of this patent is extended or adjusted under 35 U.S.C. 154(b) by 648 days.

(21) Appl. No.: 09/690,057

(22) Filed: Oct. 16, 2000

Related U.S. Application Data

(63) Continuation of application No. 09/228,141, filed on Jan. 11, 1999, now Pat. No. 6,133,939.

(51) Int. Cl.
*H04N 7/173* (2006.01)

(52) U.S. Cl. ............... 725/127; 725/107; 725/129; 333/100; 333/136

(58) Field of Classification Search ............ 725/127, 725/129, 107; 333/100, 101, 105, 109, 112, 333/136
See application file for complete search history.

(56) References Cited

U.S. PATENT DOCUMENTS

| | | | |
|---|---|---|---|
| 4,578,702 A | 3/1986 | Campbell, III | 358/86 |
| 5,058,198 A | 10/1991 | Rocci et al. | 455/3 |
| 5,635,881 A | 6/1997 | Romerein et al. | 333/107 |
| 5,638,035 A * | 6/1997 | Romerein et al. | 333/101 |
| 5,781,844 A | 7/1998 | Spriester et al. | 455/3.3 |
| 5,835,844 A | 11/1998 | Stoneback et al. | 455/5.1 |
| 5,892,653 A | 4/1999 | Nishimuta et al. | 361/643 |
| 5,945,634 A | 8/1999 | Shimirak et al. | 174/71 |
| 6,133,939 A * | 10/2000 | Gresko et al. | 725/127 |
| 6,262,636 B1 * | 7/2001 | McLain et al. | 333/109 |

FOREIGN PATENT DOCUMENTS

| | | |
|---|---|---|
| EP | 0739052 | 10/1996 |
| EP | 0778665 | 6/1997 |
| WO | 9749180 | 12/1997 |

* cited by examiner

*Primary Examiner*—Kieu-Oanh Bui
(74) *Attorney, Agent, or Firm*—Robert A Marley

(57) ABSTRACT

The present invention describes a directional CATV component, preferably a signal tap, having a housing frame where coaxial signal cable connections are made allowing for tap circuitry to be placed on either side of the housing frame. The invention allows for the rapid exchange of tap circuitry between front and rear positions providing for the reversal of signal frequency direction. The signal tap comprises a housing frame, a back cover with a support clamp and a signal tap cover containing a plurality of female F-connectors. Loss circuitry is mounted on a PC board that is attached to the tap cover.

21 Claims, 7 Drawing Sheets

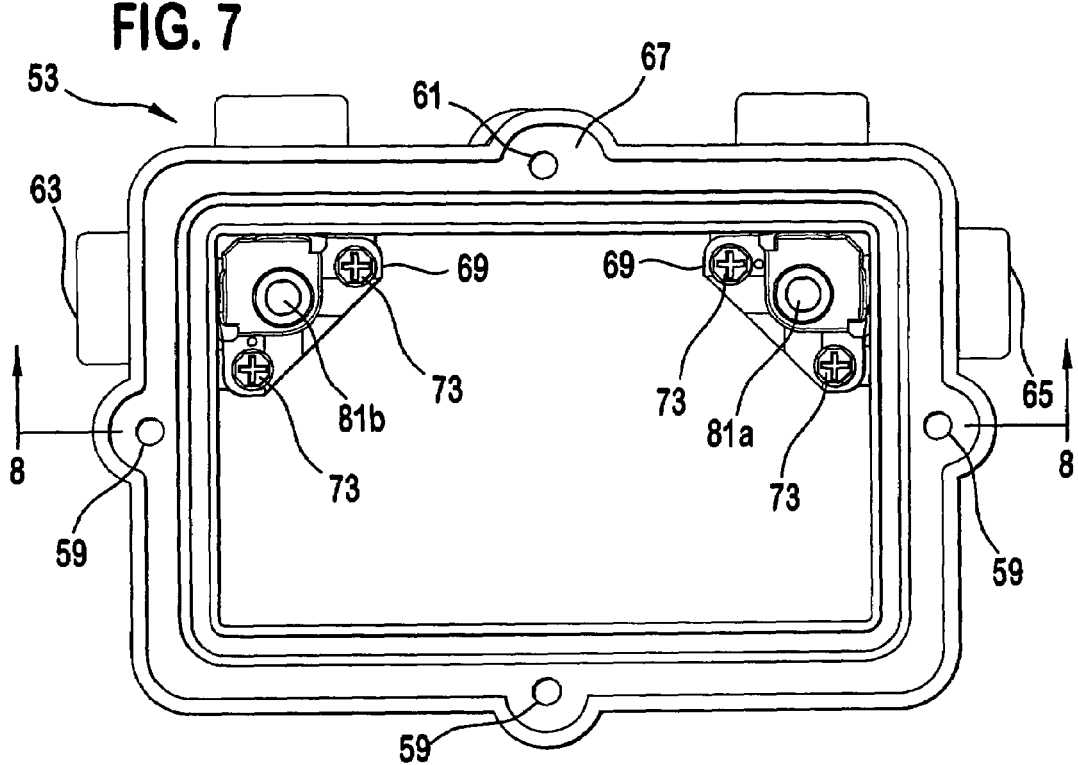
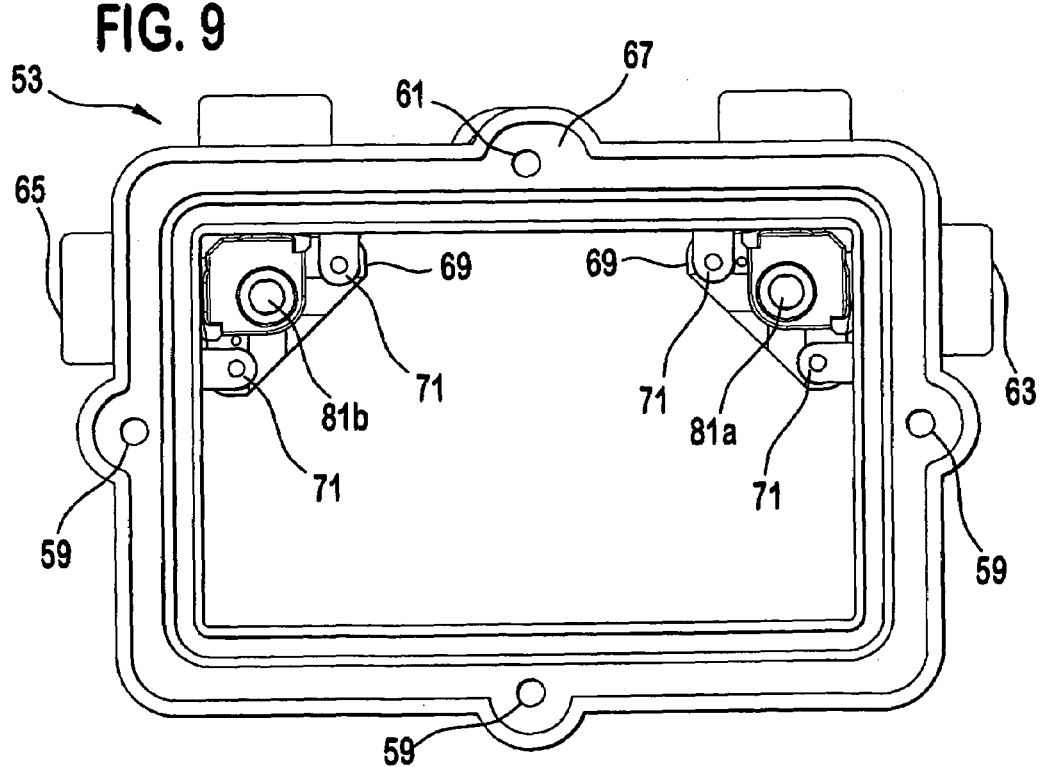

CATV DIRECTIONAL COMPONENT WITH SIGNAL REVERSING CAPABILITY AND METHOD

This is a continuation of application Ser. No. 09/228,141, filed Jan. 11, 1999, now U.S. Pat. No. 6,133,939.

BACKGROUND OF THE INVENTION

1. Field of the Invention

This invention relates generally to cable television communication system passive distribution components. More particularly, the invention relates to a signal tap having a housing frame which allows for signal distributing circuitry to be interchanged from either side of the housing frame thereby easily reversing signal direction without disconnection from the CATV coaxial signal cable.

2. Description of the Prior Art

Cable television (CATV) services are provided to customers through a transmission network that typically includes a trunk system transporting a plurality of CATV services from a headend to smaller branches and then onto individual subscriber drops. The transmission medium for the branch and subscriber drops is usually coaxial cable. The transmission network typically includes active and passive components, i.e., line amplifiers, cable taps, cable splitters, and other equipment to distribute the CATV services.

At a subscriber location, the coaxial cable is interrupted with a signal tap which distributes the CATV services to a number of individual subscribers. The signal tap is connected to the coaxial cable using F-connectors and is supported by the cable support strand or a pedestal.

A block diagram of a cable television network 15 is shown in FIG. 1. The coaxial cable 17 functions as a transmission line to provide CATV services 19 to a number of subscribers 21 at various locations. Each subscriber 21 receives signals through the individual taps 23 placed on the coaxial cable 17. Each tap 23 may provide multiple connections.

A prior art signal tap 23 is shown in FIG. 2. The tap 23 includes a body 25, a tap cover 27, a printed circuit board 29 with loss circuitry and asymmetrical connectors 31. The tap cover 27 is provided with a plurality of tap outlets 33, each providing service to a different subscriber 21. The body 25 includes threaded, female F-connector signal input 35 and output 36 ports at opposing ends for connection to the CATV distribution cable 17. The body 25 includes an integral support strand clamp 39 cast in place.

The CATV signal 19 is routed through the printed circuit board 29 rigidly attached to the inside surface of the cover 27 with a plurality of signal tap terminals 41 passing through the cover 27. A pair of signal receptors 43a, 43b are provided on the back of the printed circuit board 29. The printed circuit board 29 distributes the signal received from the headend 19 to subscribers 21 coupled to that tap 23 and passes the signal through to the output connector 36. Since subscriber tap 23 loss circuitry 29 is directional with regard to predetermined frequency bandwidths and the location of the headend, the signal has to enter the input receptor 43a and exit the output receptor 43b in the direction indicated on the tap cover 27. A detailed explanation of the function of the loss circuitry 29 is beyond the scope of the present invention. A metal braid and flexible gasket surrounds the periphery of the tap cover 27 to provide a seal for weather and EMI/RFI ingress.

The tap cover 27 and the printed circuit board 29 are secured to the main body 35 by a plurality of cover bolts at various connection points 45. Upon engagement of the cover, the pair of receptors 43a, 43b engage the connectors 31 thereby completing the circuit and maintaining continuity from the input connector 35 through the printed circuit board 29 distributing the signal to each signal tap 33 and to the output signal port 36 to other downstream subscribers 23.

Periodically, when CATV distribution systems are modernized or rebuilt to higher frequency specifications, the origin of the signal may change necessitating the reversal of the signal connections for each signal tap. As shown in FIG. 3, to reverse frequency direction 50, the coaxial cable connections 47a, 47b on the signal tap 23 must be broken and the tap 23 removed from the support strand 49. The tap 23 must be turned 180 degrees and reconnected to the coaxial cable connections 47a, 47b and support strand 49. By breaking the connections to the coaxial cable 17, potential damage to the connectors 47a, 47b may result.

It is desirable to have a signal tap that easily allows the reversal of signal direction without needing to break the coaxial cable connections.

SUMMARY OF THE INVENTION

The present invention provides a CATV signal tap having a housing frame where the external coaxial signal cable connections are made allowing for the tap circuitry to be placed on either side of the frame effecting a reversal of signal direction without breaking the CATV coaxial signal cable connections. The signal tap comprises a housing frame, a back cover with an integral support clamp and a signal tap cover with a plurality of female F-connectors. The loss circuitry is mounted on a PC board that is affixed internal to the signal tap cover. The present invention allows for the rapid exchange between the signal tap cover and rear cover allowing easy signal direction reversal.

Accordingly, it is an object of the invention to provide a signal tap which allows for easy signal direction reversal.

It is a further object of the invention to obviate breaking the external CATV coaxial signal cable connections for a signal tap if signal direction reversal is desired.

Other objects and advantages of the invention will become apparent to those skilled in the art after reading the detailed description of the preferred embodiment.

BRIEF DESCRIPTION OF THE DRAWINGS

FIG. 7 is a front elevation view of the housing frame showing the seizure posts in position.

FIG. 9 is a rear elevation view of the housing frame showing the seizure posts in position.

DESCRIPTION OF THE PREFERRED EMBODIMENTS

Figure 1:
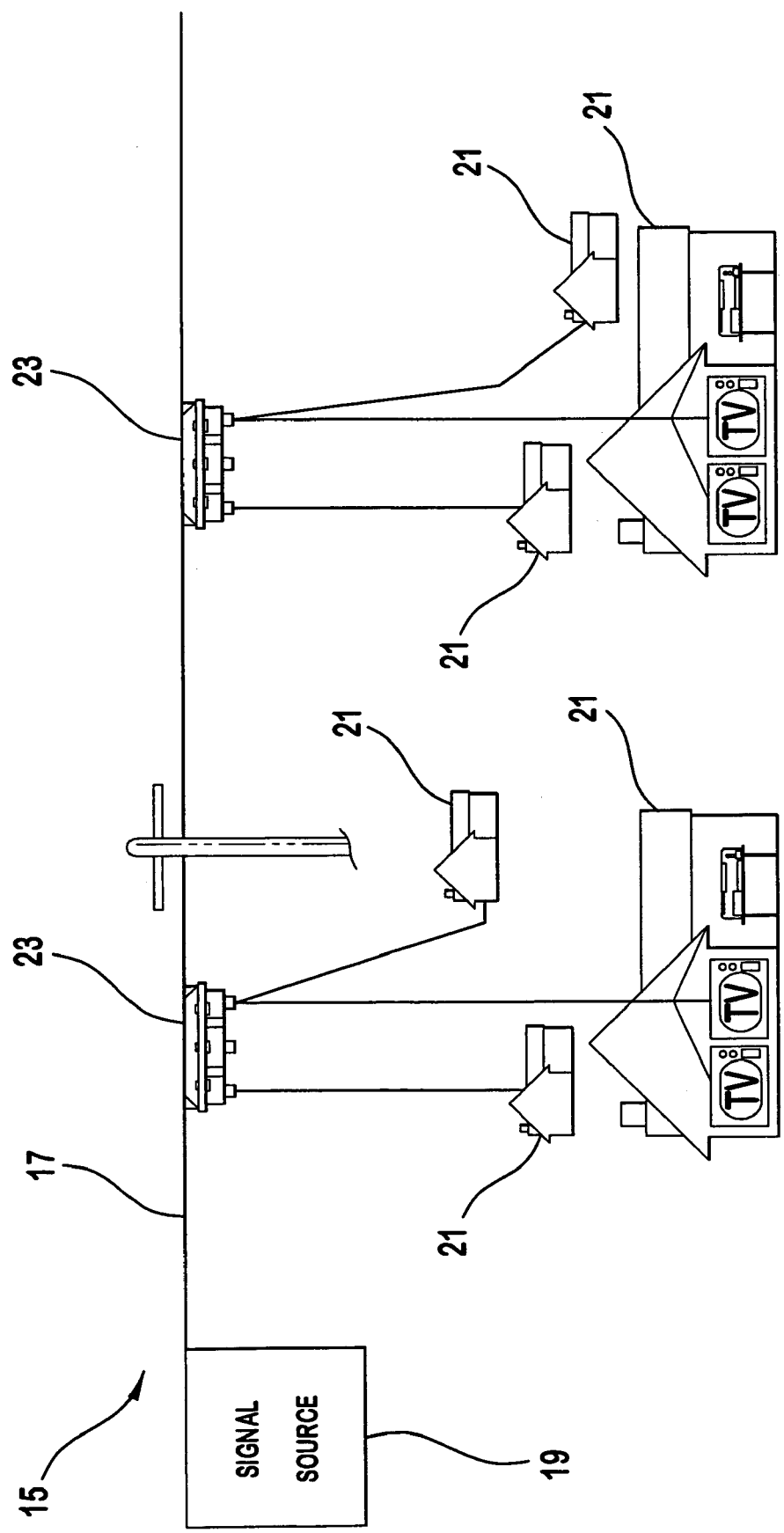
FIG. 1 is a system block diagram of a typical cable television subscriber feed.

The preferred embodiment will be described with reference to the drawing figures where like numerals represent like elements throughout.

Figure 4:
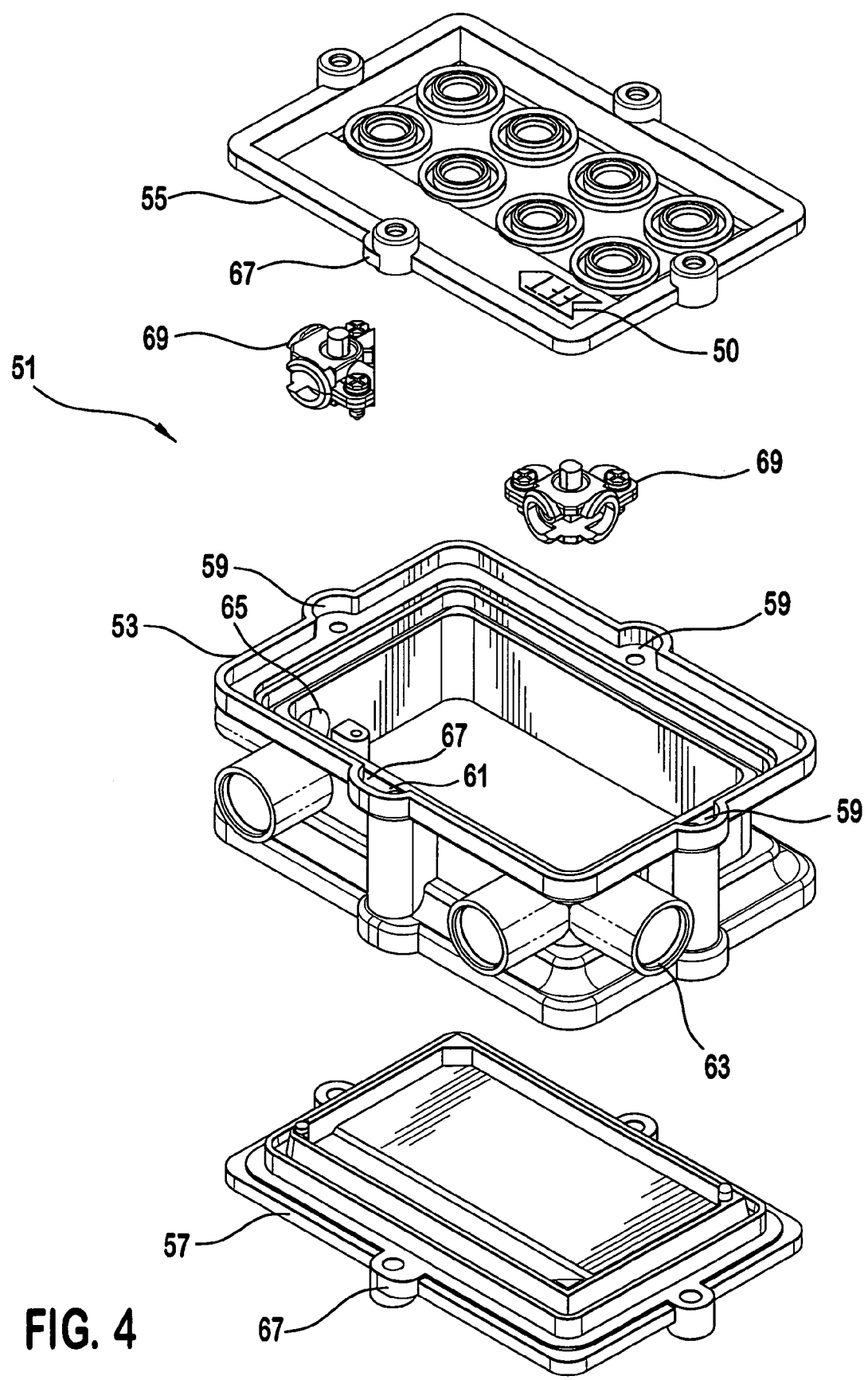
FIG. 4 is an exploded perspective view of the present invention.

The present invention 51 is shown in FIGS. 4–9. Referring to FIG. 4, the signal tap 51 includes a housing frame 53, a signal tap cover 55 and a rear cover 57. The signal tap cover 55 has signal distribution circuitry rigidly attached (not shown). The rear cover 57 has an integral cast support bracket (not shown) for aerial (strand) or pedestal support. Each side of the housing frame 53 of the signal tap 51 is symmetric with respect to the mounting holes 59 for the front 55 and rear 57 covers allowing for either cover 55, 57 to be placed on either side of the housing frame 53. The mounting hole 61 located between the input 63 and output 65 coaxial cable connectors is offset 67 such that the front 55 and rear covers 57 can only be mounted to the housing frame 53 in one orientation.

As can be seen in FIG. 4, the front 55 and rear covers 57 may be interchanged freely thereby allowing for rapid signal direction 50 reversal. In conjunction with the covers mating to either side of the housing frame 53, internal seizure posts 69 similarly provide symmetric engagement from either side of the housing frame 53 (see FIGS. 7 and 9).

Figure 2:
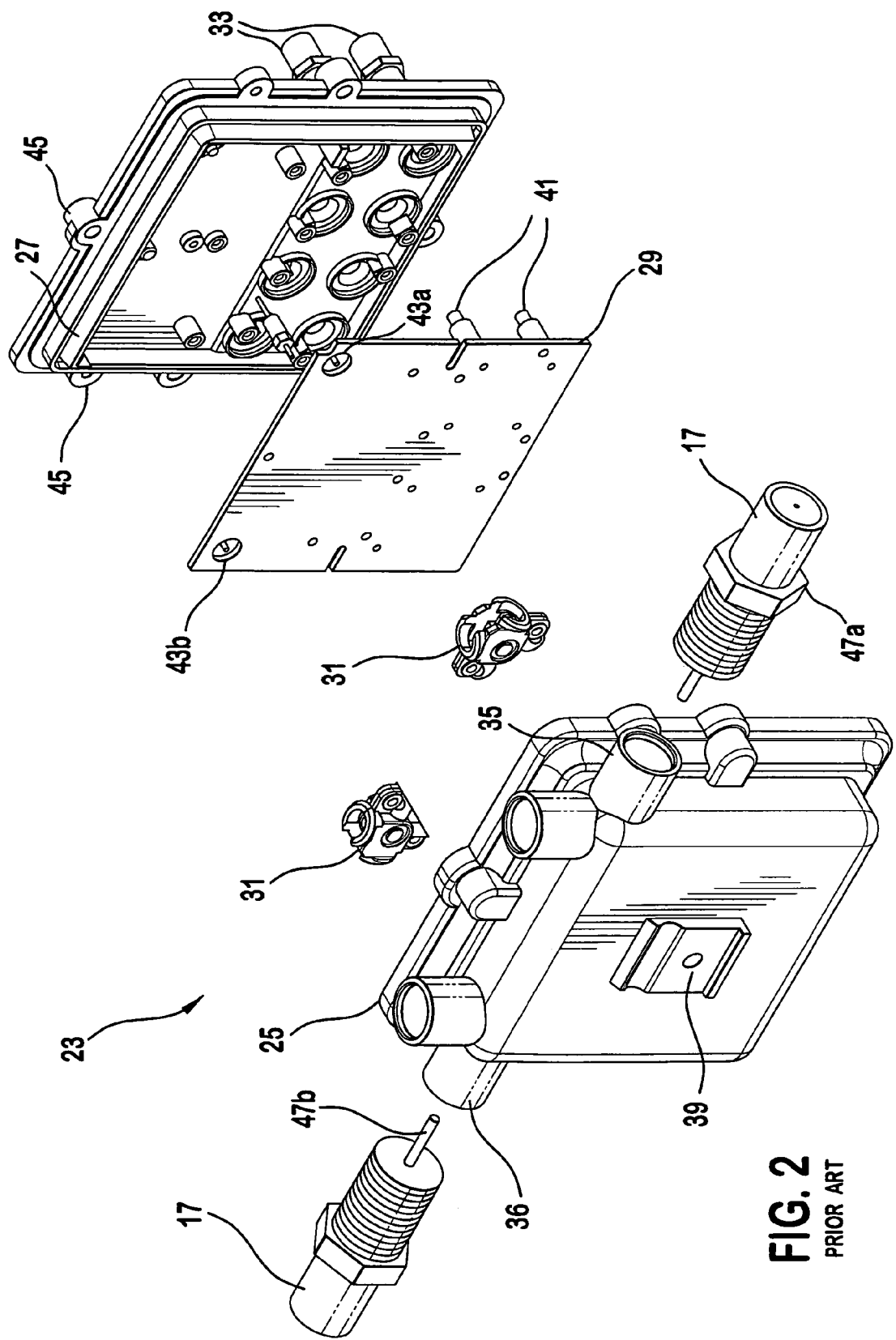
FIG. 2 is an exploded perspective view of a prior art signal tap.
Figure 3:
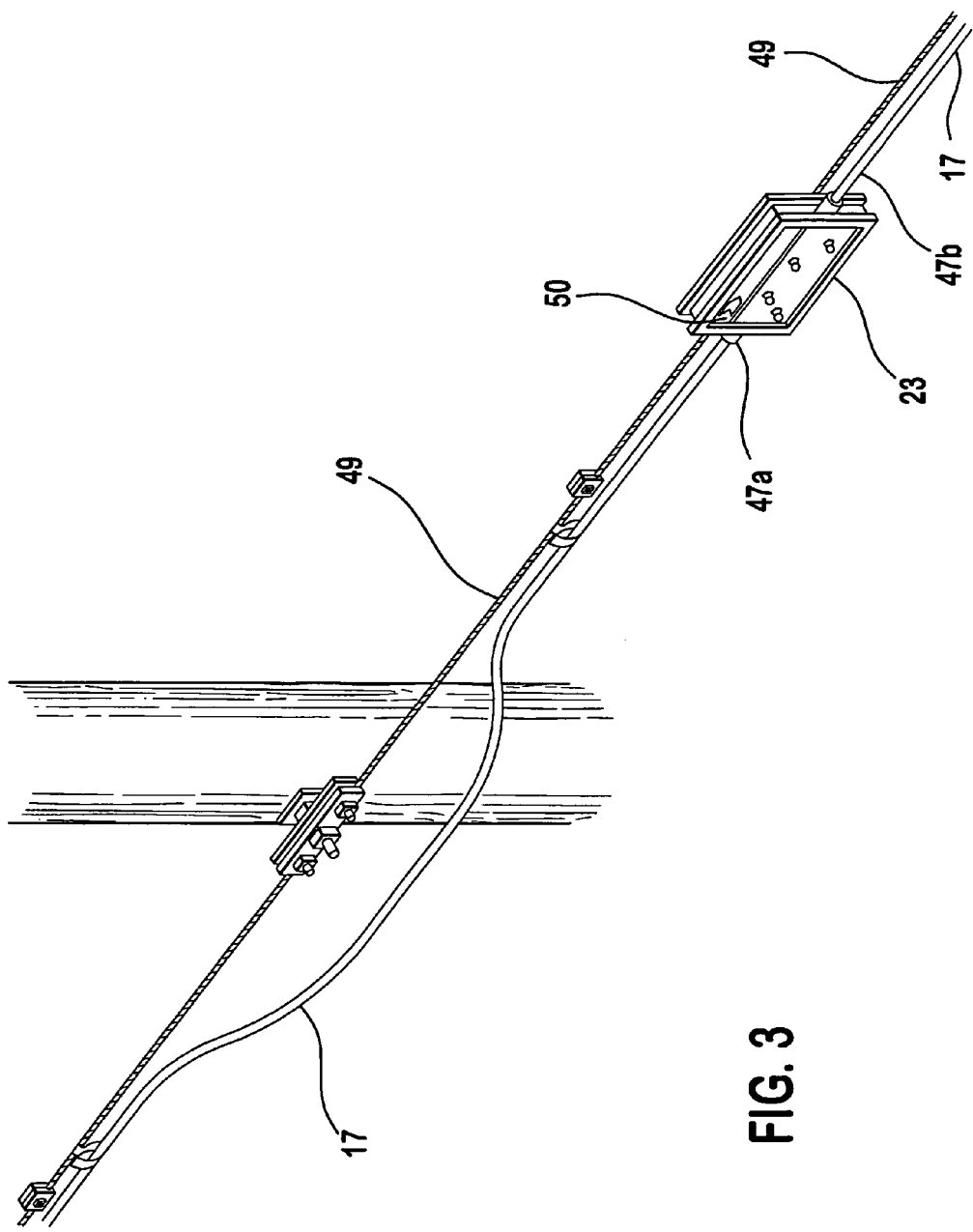
FIG. 3 is a perspective view of a signal tap suspended on a support strand.
Figure 5:
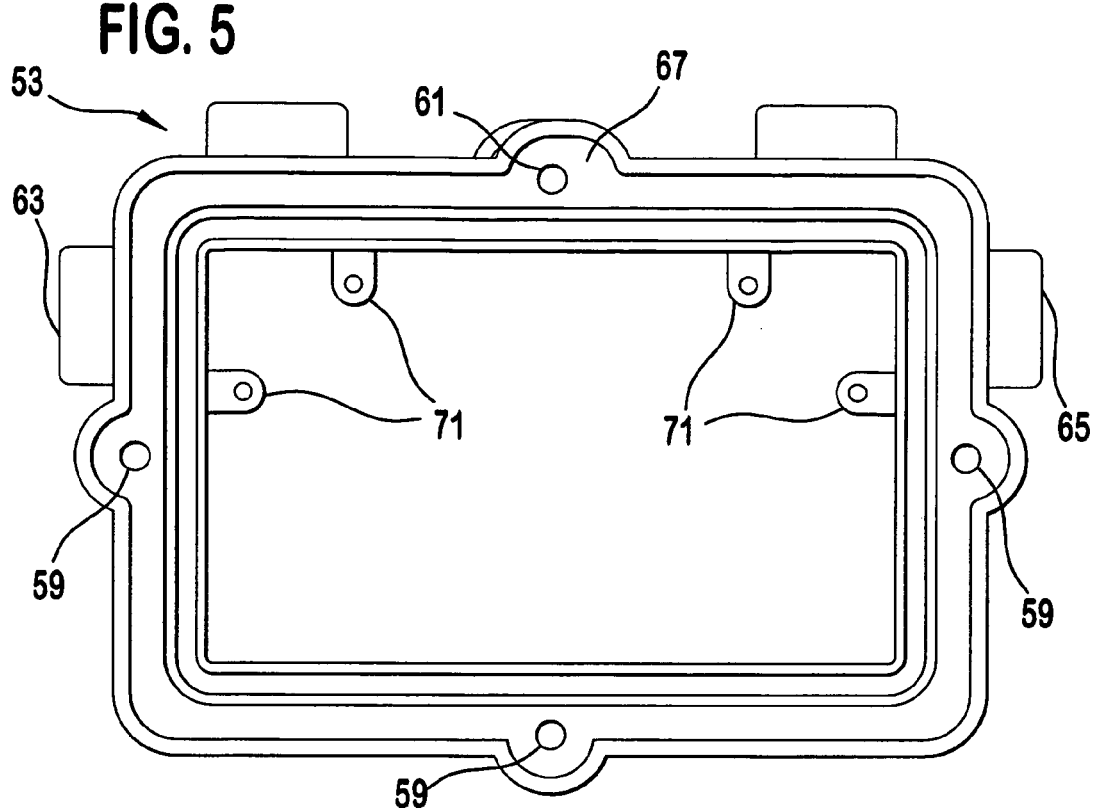
FIG. 5 is a front elevation view of the housing frame for the present invention.

Referencing FIG. 5, tapped mounting blocks 71 integrally cast with the housing frame 53 support the symmetric seizure posts 69. The seizure posts 69 are secured to the mounting blocks 71 with machine screws 73. The seizure posts 69 are used to couple the CATV coaxial cable 17 F-connectors 47a, 47b and provide mating engagement and circuit continuity with the PC board 29 (shown in FIG. 2).

Figure 8:
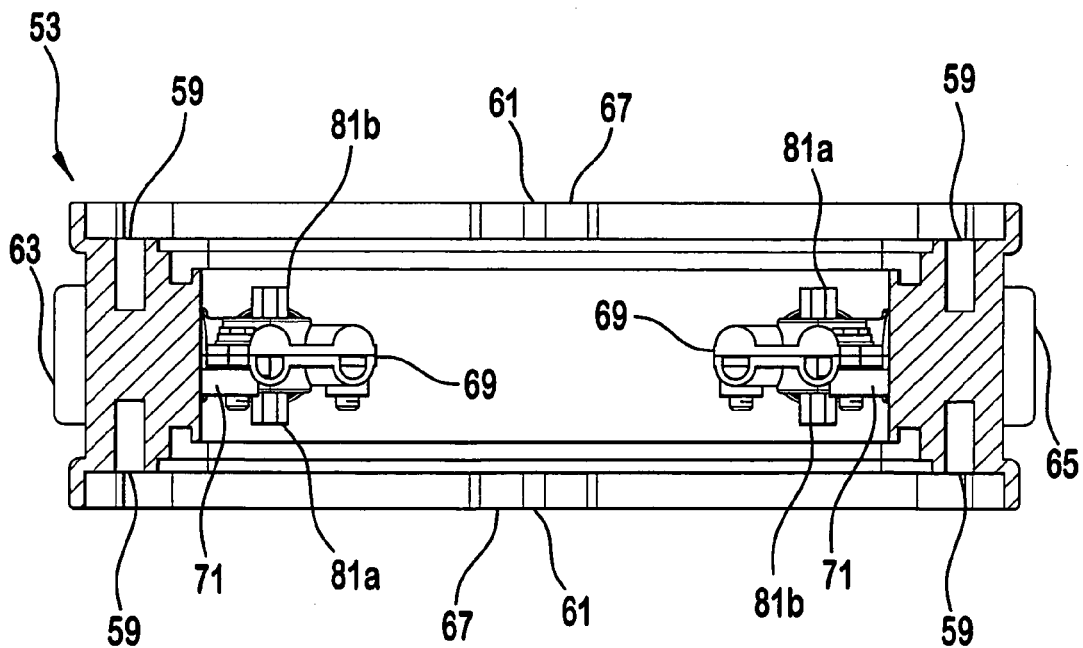
FIG. 8 is a cross sectional view along line 8—8 in FIG. 7.
Figure 6:
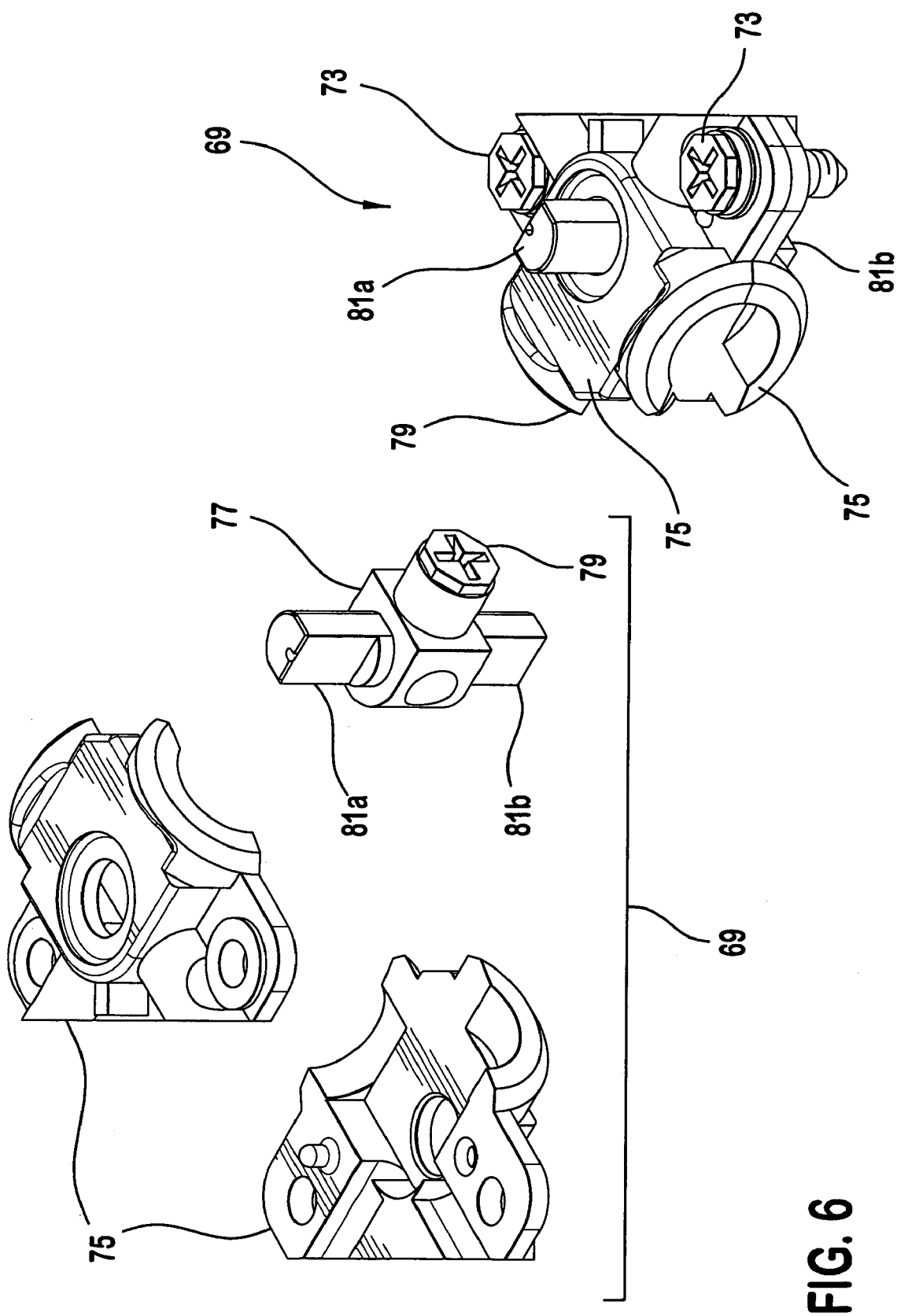
FIG. 6 is an exploded perspective view of a seizure post.

As shown in FIG. 6, the seizure post 69 includes a split insulator 75 and a conducting clamp arrangement 77 that includes a screw hold-down 79 which captures the center conductor of the CATV coaxial cable 17 F-connector 47a, 47b. Symmetric female connectors 81a, 81b extending beyond the insulating body 75 engage with male input 43a and output 43b signal receptors located on the PC board 29 (shown in FIG. 2). The female connectors 81a, 81b allow for mating engagement on either side of the housing frame 53 as shown in FIG. 8. Referencing FIGS. 7 and 9, the front view and rear view of the tap housing frame 53 with the seizure posts secured to the housing frame show that the seizure posts provide mating engagement on either side of the housing frame 53 with the PC board signal receptors 43a, 43b. The present invention 51 allows for the rapid exchange of the tap (front) and rear covers reversing signal 50 direction.

While the present invention has described in terms of the preferred embodiment, other variations which are within the scope of the invention as outlined in the claims below will be apparent to those skilled in the art.

What is claimed is:

1. A CATV directional component for receiving and transmitting RF signals, comprising:
   a housing frame having first and second openings and first and second signal I/O ports;
   two housing covers which are interchangeably installed within said first and second openings; one of said housing covers including a directional processor having a reception port and a transmission port;
   said directional processor may be positioned in either of two positions;
   a first position to receive said RF signals in a forward direction, whereby said first I/O port is coupled to said reception port and said second I/O port is coupled to said transmission port; and
   a second position to receive said RF signals in a reverse direction, whereby said second I/O port is coupled to said reception port and said first I/O port is coupled to said transmission port,
   whereby the direction of the directional processor is reversed by switching the two housing covers in said first and second opening on the housing frame.

2. The directional component of claim 1 wherein said first and second I/O signal ports comprise at least two co-axial receptors for coupling said first and second I/O ports to said reception and transmission ports of said directional component.

3. The directional component of claim 2 wherein the first and second signal I/O ports are maintained in position by the housing frame.

4. The directional component of claim 3 wherein said first and second I/O signal ports each have a connector extending inwardly toward one another from opposing sides of said frame.

5. The directional component of claim 4 wherein said connectors further extend in opposing directions from said housing frame, for connection with a coaxial cable coupling.

6. The directional component of claim 5 wherein the two covers are mounted upon opposite sides of said housing frame thereby enclosing said directional processor and said first and second I/O signal ports.

7. A CATV directional component for receiving and transmitting RF signals, comprising:
   a housing frame securing first and second signal I/O ports, each port having an associated input and output receptor, said input and output receptors facing in opposing directions;
   two housing covers, which are interchangeably installed on either side of the housing frame, one of said covers including a directional processor having a reception port and a transmission port;
   said directional processor may be positioned in either of two positions;
   a first position to receive said RF signals in a forward direction, whereby said first input receptor is coupled to said reception port and said second output receptor is coupled to said transmission port; and
   a second position to receive said RF signals in a reverse direction, whereby said second output receptor is coupled to said reception port and said first output receptor is coupled to said transmission port,
   whereby the direction of the directional processor is reversed by switching the two covers on the housing frame.

8. The directional component of claim 7 wherein the first and second signal I/O ports are maintained in position by the housing frame.

9. The directional component of claim 8 wherein said first and second I/O signal ports each have a connector extending inwardly toward one another from opposing sides of said frame.

10. The directional component of claim 9 wherein said connectors further extend in opposing directions from said housing frame, for connection with a coaxial cable coupling.

11. The directional component of claim 10 wherein the two covers are mounted upon opposite sides of said housing frame thereby enclosing said directional processor and said first and second I/O signal ports.

12. A CATV directional component for receiving and transmitting RF signals, comprising:
   a housing frame securing a first signal I/O port having a first input and first output receptor, said first input and first output receptors facing in opposing directions;

the housing frame also securing a second signal I/O port having a second input and second output receptor, said second input and second output receptors facing in opposing directions;

two housing covers which are interchangeably installed on either side of the housing frame, at least one of the two covers including a directional processor having reception port and a transmission port;

said directional processor may be positioned in either of two positions;

a first position to receive said RF signals in a forward direction, whereby said first input receptor is coupled to said reception port and said second output receptor is coupled to said transmission port; and a second position to receive said RF signals in a reverse direction, whereby said second output receptor is coupled to said reception port and said first output receptor is coupled to said transmission port, whereby the direction of the directional processor is reversed by switching the two covers on the housing frame.

13. The directional component of claim 12 wherein the first and second signal I/O ports are maintained in position by the housing frame.

14. The directional component of claim 13 wherein said first and second I/O signal ports each have a connector extending inwardly toward one another from opposing sides of said frame.

15. The directional component of claim 14 wherein said connectors further extend in opposing directions from said housing frame, for connection with a coaxial cable coupling.

16. The directional component of claim 15 wherein the two covers are mounted upon opposite sides of said housing frame thereby enclosing said directional processor and said first and second I/O signal ports.

17. A CATV directional component for receiving and transmitting RF signals, comprising:

a housing frame securing first and second signal I/O ports;

two housing covers which are interchangeably installed on either side of the housing frame, at least one of the two covers including a directional processor comprising a reception port, a transmission port and at least one subscriber tap;

said directional processor may be positioned in either of two positions;

a first position to receive said RF signals in a forward direction, whereby said first I/O port is coupled to said reception port and said second I/O port is coupled to said transmission port; and a second position to receive said RF signals in a reverse direction, whereby said second I/O port is coupled to said reception port and said first I/O port is coupled to said transmission port, whereby the direction of the directional processor is reversed by switching the two covers on the housing frame.

18. The directional component of claim 17 wherein said first and second I/O signal ports comprise at least two co-axial receptors for coupling said first and second I/O ports to said reception and transmission ports of said directional component.

19. The directional component of claim 18 wherein the first and second signal I/O ports are maintained in position by the housing frame.

20. The directional component of claim 19 wherein said first and second I/O signal ports each have a connector extending inwardly toward one another from opposing sides of said frame.

21. The directional component of claim 20 wherein said connectors further extend in opposing directions from said housing frame, for connection with a coaxial cable coupling.

* * * * *